US 8,190,723 B2

(12) United States Patent
Datla et al.

(10) Patent No.: US 8,190,723 B2
(45) Date of Patent: May 29, 2012

(54) METHOD AND SYSTEM FOR AUTOMATICALLY DETERMINING COMMANDS FOR A NETWORK ELEMENT

(75) Inventors: Krishnam Datla, Union City, CA (US);
Srinivasa Beereddy, Fremont, CA (US);
Praveen Vengalam, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 971 days.

(21) Appl. No.: 11/012,885

(22) Filed: Dec. 14, 2004

(65) Prior Publication Data

US 2005/0195738 A1 Sep. 8, 2005

Related U.S. Application Data

(60) Provisional application No. 60/481,790, filed on Dec. 14, 2003.

(51) Int. Cl.
*G06F 15/173* (2006.01)

(52) U.S. Cl. ........ 709/223; 709/224; 709/218; 709/249; 709/203; 709/217; 455/41.1; 455/41.2; 370/466

(58) Field of Classification Search ................... 709/223
See application file for complete search history.

(56) References Cited

U.S. PATENT DOCUMENTS

| | | | |
|---|---|---|---|
| 4,972,264 A | 11/1990 | Bishop et al. | |
| 6,421,719 B1 | 7/2002 | Lewis et al. | |
| 6,546,380 B1 * | 4/2003 | Lautzenheiser et al. | 706/47 |
| 6,597,666 B1 | 7/2003 | Hemzal et al. | |
| 6,601,059 B1 | 7/2003 | Fries | |
| 6,615,257 B2 | 9/2003 | Lee et al. | |
| 6,920,458 B1 | 7/2005 | Chu et al. | |
| 7,032,014 B2 | 4/2006 | Thiyagarajan et al. | |
| 7,051,101 B1 | 5/2006 | Dubrovsky et al. | |
| 7,113,989 B2 | 9/2006 | Murray et al. | |
| 7,216,298 B1 | 5/2007 | Ballard et al. | |
| 7,219,339 B1 | 5/2007 | Goyal et al. | |
| 7,284,009 B2 | 10/2007 | Perrow | |
| 7,287,069 B1 | 10/2007 | Kavasseri et al. | |
| 7,290,248 B2 | 10/2007 | Sengodan | |
| 7,376,719 B1 | 5/2008 | Shafer et al. | |

(Continued)

OTHER PUBLICATIONS

Cisco Systems, "Using the Cisco IOS Command Line Interface", Oct. 2, 1998, Cisco Systems, Chapter 3 of "Cosco 6200 User Guide", all pages.*

(Continued)

*Primary Examiner* — Hua Fan
(74) *Attorney, Agent, or Firm* — Hickman Palermo Truong Becker Bingham Wong LLP (57) ABSTRACT

A method of automatically determining a set of commands that a network device supports comprises the machine-implemented steps of receiving a syntax definition for a command help syntax of a network device; sending a seed command to the network device; receiving and storing a response from the network device; creating and storing information identifying commands that the network device supports, based on the response, in a database of command knowledge; determining and sending to the network device one or more command requests that cause the network device to respond with further information defining supported commands; creating and storing further information identifying additional commands or parameters supported by the network device, based on responses from the network device to the command requests, in the database; and repeating the determining, sending, creating and storing steps until the information in the database represents all commands and parameters that the network device supports.

15 Claims, 6 Drawing Sheets

U.S. PATENT DOCUMENTS

| | | | |
|---|---|---|---|
| 7,418,733 | B2 | 8/2008 | Connary et al. |
| 7,631,302 | B2 | 12/2009 | Cool et al. |
| 7,779,398 | B2 | 8/2010 | Tjong et al. |
| 2003/0098887 | A1 | 5/2003 | Li |
| 2003/0101240 | A1* | 5/2003 | Courtney ................ 709/220 |
| 2003/0115305 | A1 | 6/2003 | Murray et al. |
| 2004/0030771 | A1 | 2/2004 | Strassner |
| 2004/0111499 | A1 | 6/2004 | Dobrowski et al. |
| 2004/0117624 | A1 | 6/2004 | Brandt et al. |
| 2004/0153536 | A1 | 8/2004 | Strassner |
| 2004/0210654 | A1 | 10/2004 | Hrastar |
| 2004/0230681 | A1 | 11/2004 | Strassner et al. |
| 2005/0004942 | A1 | 1/2005 | Madsen et al. |
| 2005/0015624 | A1 | 1/2005 | Ginter et al. |
| 2005/0108387 | A1 | 5/2005 | Li et al. |
| 2005/0114479 | A1 | 5/2005 | Watson-Luke |
| 2005/0182969 | A1 | 8/2005 | Ginter et al. |
| 2005/0262225 | A1 | 11/2005 | Halpern et al. |
| 2006/0004680 | A1 | 1/2006 | Robarts et al. |
| 2007/0180432 | A1 | 8/2007 | Gassner et al. |

OTHER PUBLICATIONS

AdventNet, "AdventNet Web NMS 4," AdventNet Datasheet, 2005, located on the internet at <http://www.adventnet.com/products/webnms/webnms_ds.pdf>, 4 pages.

Alcatel Internetworking, Inc., "Alcatel OmniVista," Alcatel OmniVista pamphlet located on the internet at <http://www.alcatel.com/com/en/appcontent/opgss/OV2770Brochure_033005_tcm228-222791635.pdf>, 2005, 13 pages.

Cisco, "Using the Cisco IOS Command Line Interface", Oct. 2, 1998, Chapter 3, 8 pages.

U.S. Appl. No. 11/148,708, filed Jun. 8, 2005, Office Action, Mailing Date Jun. 15, 2010.

Gicca Greg, "A Simple Standardized Ada Command Line Interface", Ada Technology Group, Sanders Associates, vol. X, No. 5, May 1990, 13 pages.

\* cited by examiner

```xml
<?xml version='1.0' ?>
<CliParserData>
  <ViewList>
    <View name='test-view' prompt='test-view' level='0' parent='exec'>
      <Keyword id='root' hint='TopLevel' descr='TopLevel'>
        <!-- Start of test commands -->

<Keyword id='test' hint='test' descr='command syntax tester'>
          <Month id='month' hint='MONTH' descr='name of the month'>
            <Callback/>
          </Month>

<Time id='time' hint='hh:mm:ss' descr='time of the day'>
            <Callback/>
          </Time>
        </Keyword>

<!-- END of test commands -->
      </Keyword>
    </View>
  </ViewList>
</CliParserData>
```

METHOD AND SYSTEM FOR AUTOMATICALLY DETERMINING COMMANDS FOR A NETWORK ELEMENT

CROSS-REFERENCE TO RELATED APPLICATIONS

Priority Claim

This application claims domestic priority under 35 U.S.C. 119(e) from prior provisional application Ser. No. 60/481,790, filed Dec. 14, 2003, the entire contents of which are hereby incorporated by reference for all purposes as if fully set forth herein.

FIELD OF THE INVENTION

The present invention generally relates to computer network management. The invention relates more specifically to methods for determining a command set of a network element.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Figure 1:
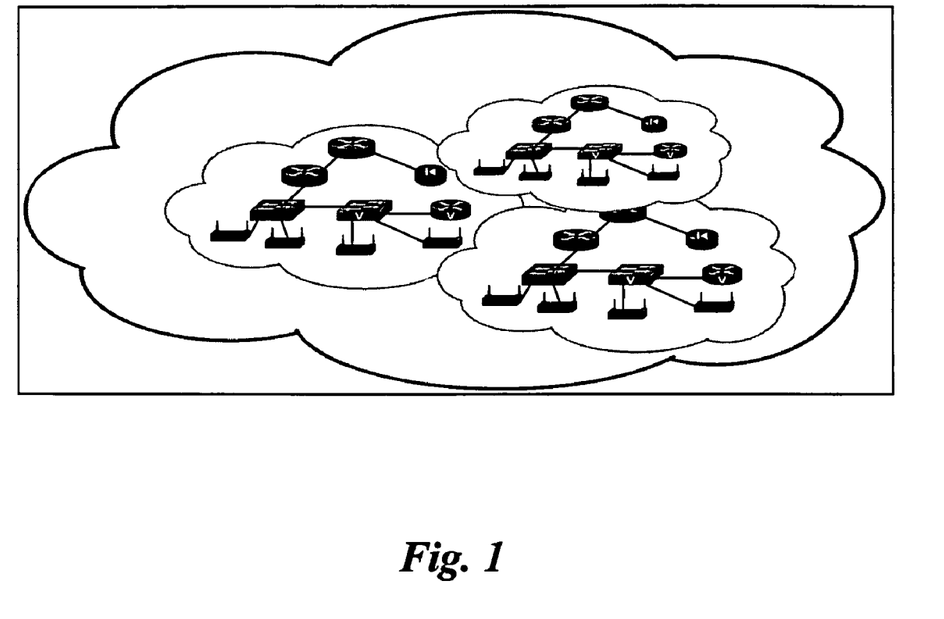
FIG. 1 is a block diagram of a typical network arrangement in which an embodiment may be implemented.

A typical computer network consists of various devices such as routers, switches, wireless access points, firewalls, etc. FIG. 1 illustrates an example network that includes such elements.

A typical network device provides a command interface that is accessible using the telnet protocol, a secure shell (SSH) connection, or serial port interface to create, update, retrieve and store management information relating to the device. A network management station (NMS) can deliver commands through such an interface to provide a higher level or enhanced management capability to the network operator or administrator.

To interoperate with a network device, the NMS must have knowledge of what commands the device supports, so that the NMS can deliver commands that are compatible with the device's command interface and that produce desired results. One way to provide such knowledge to an NMS is by adding command definitions to the NMS manually, either through a programmatic approach by updating the computer program code that forms the NMS, or by changing a separate device data table that is used by the NMS. However, this approach is slow and error-prone, especially when the NMS supports a large number of different devices.

Further, whenever a change occurs in the set of commands that a particular device type supports, a change is required to the NMS. Thus, this approach requires ongoing software development efforts to keep the NMS compatible with the commands that devices recognize or support.

Therefore, there is a need for a better way to provide knowledge about commands that a network device supports.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system for automatically determining commands for a network element is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural And Functional Overview |
| 3.0 | Implementation Mechanisms - Hardware Overview |
| 4.0 | Extensions and Alternatives |

1.0 General Overview

The needs identified in the foregoing Background, and other needs and objects that will become apparent for the following description, are achieved in the present invention, which comprises, in one aspect, a method for automatically determining a set of commands that a network device supports comprises the machine-implemented steps of receiving a syntax definition for a command help syntax of a network device; sending a seed command to the network device; receiving and storing a response from the network device; creating and storing information identifying commands that the network device supports, based on the response, in a database of command knowledge; determining and sending to the network device one or more command requests that cause the network device to respond with further information defining supported commands; creating and storing further information identifying additional commands or parameters supported by the network device, based on responses from the network device to the command requests, in the database; and repeating the determining, sending, creating and storing steps until the information in the database represents all commands and parameters that the network device supports.

According to one feature, the seed command is any of a help command and a "?" command.

In other features, the syntax information identifies, for a particular network device type, any of: (a) a command that causes the network device to respond with a list of all commands supported by that particular network device type; (b) a response that indicates when a previously issued command is missing a required parameter; (c) a response that indicates when a previously issued command is missing a required sub-command; (d) a response that indicates when a previously issued command included a parameter having an incorrect format; and (e) a response that indicates when a previously issued command has caused the network device to change command context.

In yet another feature, the method, further comprises detecting when a previously issued command has caused the network device to change command context, and storing information defining subsequent commands and parameters in a different context in the database of command knowledge.

Another feature provides for discontinuing the repeating upon determining that a previously issued command can include an unlimited number of parameters or sub-commands.

In other aspects, the invention encompasses a computer apparatus and a computer-readable medium configured to carry out the foregoing steps.

2.0 Structural and Functional Overview

In one embodiment, a method and system for automatically determining commands for a network element are implemented using an auto-learning software framework that learns commands that particular network devices support in an automated manner, and builds a command knowledge base. A network management system or station (NMS) can use the knowledge base to provide management for a large number of different types of devices quickly and efficiently. The disclosed approach is less error-prone compared to manual entry or coding of device commands.

Figure 2:
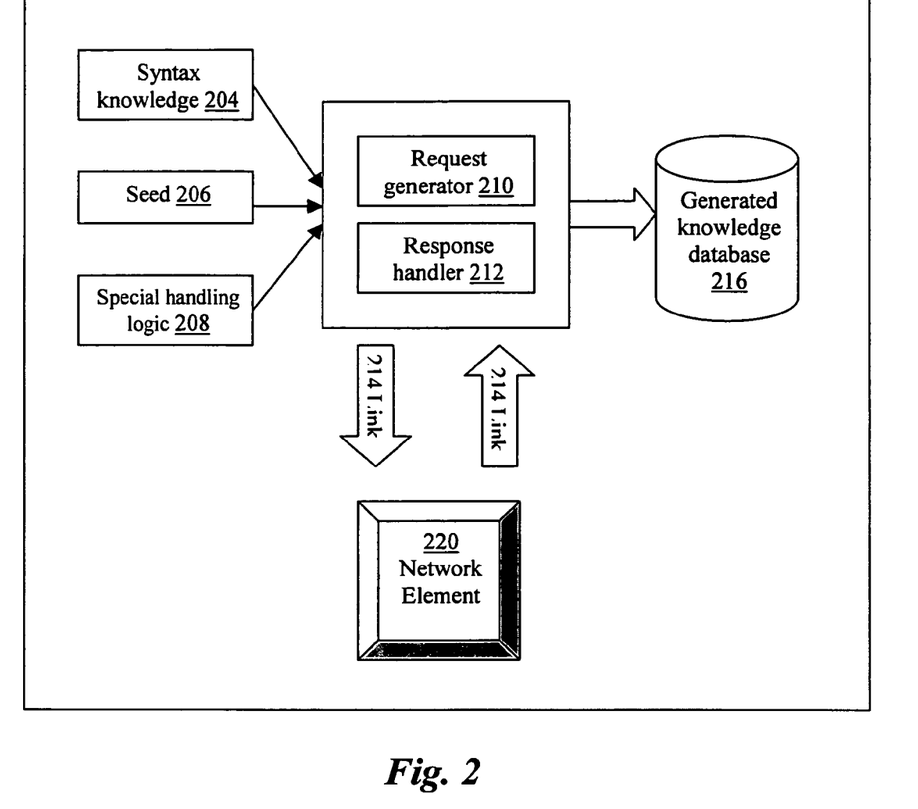
FIG. 2 is a block diagram of an auto-learner framework according to some embodiments.
Figure 3A:
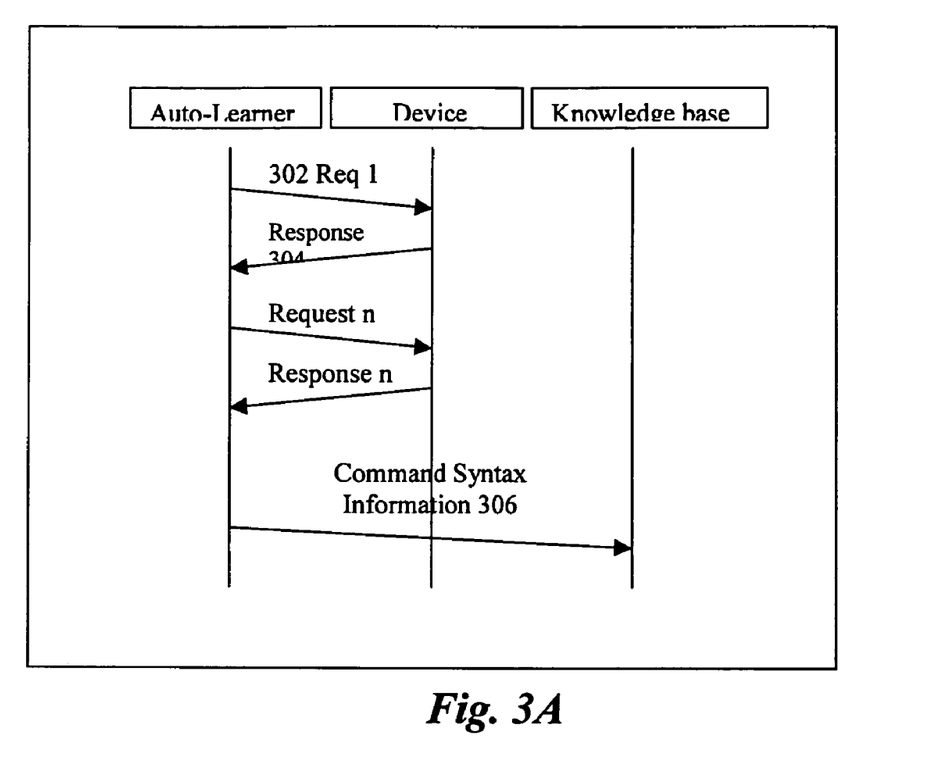
FIG. 3A is a block diagram of an auto-learning process.
Figure 3B:
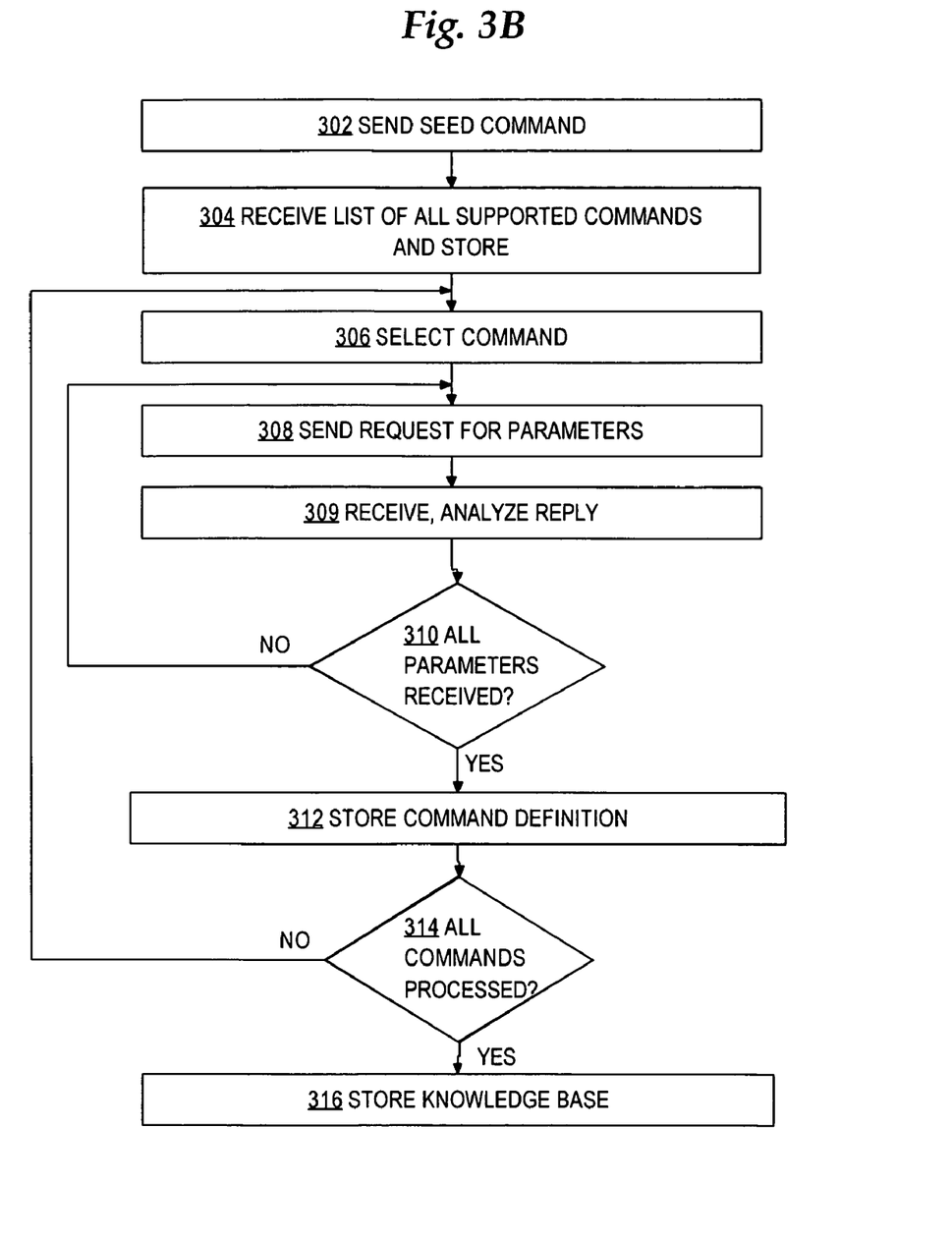
FIG. 3B is a flow diagram of an auto-learning process.
Figure 4:
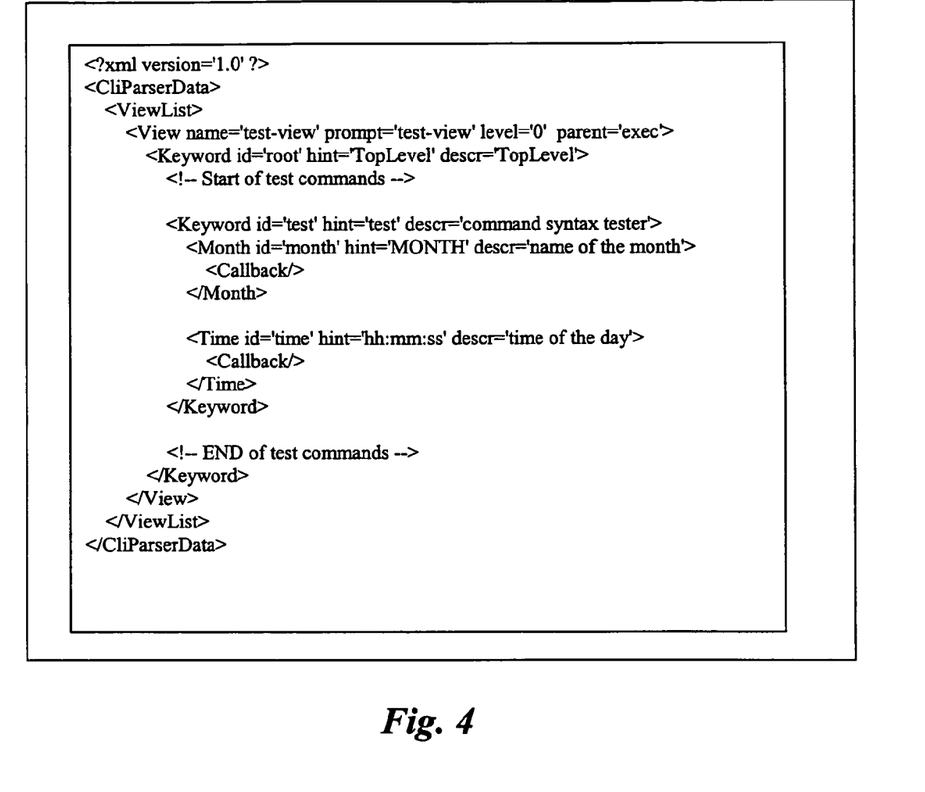
FIG. 4 is an example command knowledge base in XML format.

An example embodiment is now described with reference to FIG. 2, FIG. 3A, FIG. 3B, and FIG. 4. FIG. 2 is a block diagram of an auto-learner framework according to some embodiments; FIG. 3A is a ladder diagram of an auto-learning process; FIG. 3B is a flow diagram of an auto-learning process; and FIG. 4 is an example command knowledge base in XML format.

2.1 Structural Overview

Referring now to FIG. 2, according to one embodiment, an auto-learner framework 202 comprises device command syntax knowledge 204, a seed command 206, special case handling logic 208, a request generator 210, and a response handler 212. An embodiment may implement framework 202 in one or more computer programs or other software elements, firmware, or any combination thereof. Framework 202 is coupled to or includes a knowledge base 216, which provides a repository for storing information that defines commands that a network element 220 supports. Framework 202 is coupled, directly or indirectly through one or more networks, to network element 220.

In an embodiment, before interacting with network element 220, framework 202 has information identifying a type of network element 220, and syntax knowledge 204 defining a general command syntax used by the network element. However, framework 202 does not have information specifying the complete command set that the network element 220 supports. Further, framework 202 does not have information indicating whether the command set of the network element 220 has changed recently.

Network element 220 may comprise any network end station or infrastructure element that supports a command language for configuration or management, such as a router, switch, wireless access point, firewall, etc. Thus, the techniques herein apply broadly to any network end station or infrastructure element that supports such a command language for any purpose. Further, in this description, the term "device" refers broadly to any network end station or infrastructure element.

In an embodiment, auto-learner framework 202 assumes that commands that a device supports conform to a certain syntax. Information defining the general syntax used for a device is stored in device command syntax knowledge 204. For example, device command syntax knowledge 204 defines what data types or classes of values can be used as parameters for particular commands. The syntax knowledge also defines command contexts, if a particular device implements command contexts. For example, certain commands cause a network element to enter a different context, and subsequent commands issued in one context will produce a different result than if the same commands are issued in a different context. The syntax knowledge 204 further defines what part of a response indicates that a command definition is complete. The use of information contained in syntax knowledge 204 is clarified in the description below.

The seed command 206 defines a particular device command which, when sent to network element 220, will cause network element to reply with a list of supported commands.

Special case handling logic 208 provides program code or other software elements for handling exceptions to the general rules that are defined in syntax knowledge 204. Such exceptions may be the same for all devices in a family of devices, or may apply only to the functionality or feature that is being learned at a particular time.

Request generator 210 forms and sends commands or information requests to network element 220. Response handler 212 processes replies that are received from the network element 220 and creates data for storage in the knowledge base 216.

2.2 Functional Overview

Referring now to FIG. 3A, in one embodiment, the techniques herein use active interaction with a device to learn device commands. In one approach, a command expressing a request is sent to the device, as indicated by arrow 302. At arrow 304, a response is received from the device, the response is analyzed, and information defining a learned command is stored based on the response. Further requests are sent to get more information on the command if the received response does not represent a complete definition of the command or if the response is insufficient to build complete knowledge of a command. The preceding process is repeated until all the supported commands are learned. Command syntax information is stored in a device command knowledge base is built, as shown by arrow 306.

FIG. 3B illustrates an example process in more detail. For purposes of illustrating a clear example, FIG. 3B is described in the context of the system of FIG. 2. However, other embodiments of the techniques of FIG. 3B may be implemented in the context of other systems.

In step 302, a seed command is sent. For example, auto-learner framework 202 sends seed command 206 to network element 220. In step 304, a list of all supported commands for the device is received and stored. For example, network element 220 responds with information defining all commands that it supports. In one embodiment, the seed command 206 is a "help" or "?" command, and in response, the network element provides a list of all commands that are allowed in the then-current context of the network element. Routers, switches, and other network devices from Cisco Systems, Inc., San Jose, Calif., support seed commands of the type just described.

At step 306, the process selects one command in the received list for further processing. Step 306 represents the start of a loop that ends at step 314 and includes steps 308, 310, 312 for determining what parameters the network element requires, uses or defines as part of the selected command. For example, at step 308, the process sends a request for parameters for the selected command. At step 310, the process determines if all parameters for the request have been received, based on receiving and analyzing a response from the network element, as shown by step 309.

If not all the parameters were received for the selected command, then control returns to step 308 and further parameter requests are sent. If all parameters have been received, then at step 312, information defining the selected command is stored.

For example, assume that the network element 220 supports a command named "cmd1" that requires two parameter values to be set, and that the required syntax is "cmd1 parameter1 value1 parameter2 value2." In one case, step 308 involves sending the request "help cmd1," and in response, the network element provides a complete listing of parameters and values. In another case, step 308 involves sending an incomplete command and the network element responds by providing a complete listing of parameters and values.

In yet another case, step 308 involves sending an incomplete command, and a response from the network element indicates only the next parameter that the command syntax requires. For example, sending a request of the form "cmd1 parameter1" causes the network element to respond indicating that it needs a value of type X. The particular one of the foregoing cases applicable to a particular type of network element may vary according to the vendor of the network element, the operating system, or other factors. The particular one of the foregoing cases applicable to a particular type of network element may be defined, in one embodiment, in syntax knowledge 204.

Requests sent at step 308 might require a literal value for a parameter in order to enable the process of FIG. 3B to determine the next valid parameter for a command. In one embodiment, step 308 involves forming a command that includes valid sample values for any parameters that require specifying a value as a condition to learn the next parameter. For example, to induce a response that defines additional parameters for a command relating to setting parameters on a fast Ethernet interface of a wireless access point, the command must include a valid IP address for the interface. In this example, step 308 involves generating a sample Ethernet interface address to include in the command.

Some commands that some network elements support may allow an unlimited number of parameters and values. Therefore, the approach of FIG. 3B is provided with a mechanism to prevent endless loops. For example, assume that at step 308 and step 309 the following command example and reply are sent and processed, respectively:

```
issc-gw#show ip bgp community ?
    <1-4294967295>   community number
    exact-match      Exact match of the communities
    local-AS         Do not send outside local AS (well-known
community)
    no-advertise     Do not advertise to any peer (well-known
community)
    no-export        Do not export to next AS (well-known community)
    |                Output modifiers
    <cr>
```

Assume further that after analysis at step 309, the process next sends the command and reply as follows:

```
issc-gw#show ip bgp community 123 ?
    <1-4294967295>   community number
    exact-match      Exact match of the communities
```

-continued

```
    local-AS         Do not send outside local AS (well-known
community)
    no-advertise     Do not advertise to any peer (well-known
community)
    no-export        Do not export to next AS (well-known community)
    |                Output modifiers
    <cr>
```

In this case, the same set of parameters and descriptions has been provided by the network element in responses for both commands identifying the "community" node and "<1-4294967295>" node. The second request included "123" as a sample node identifier value and received the same result as when the first request included "community" as a node identifier. Therefore, sending further commands that specify additional nodes will not yield additional useful information, and an unlimited list of parameter values is allowed. Therefore, the process detects an endless loop and discontinues requesting parameters for the current command.

In an embodiment, the presence of a recursive command that will cause an endless loop is detected as follows. First, the process compares the help command result, which is a list of parameter hints and descriptions, for the current node's parent with the current node's help results. In this context, "node" refers to a data structure in the knowledge base that defines and is associated with a command. If the result information is the same for both nodes, then the process of FIG. 3B considers an unlimited parameter list to exist, and this is represented in the command knowledge base.

At step 314, a test is performed to determine if all commands have been processed. If so, then at step 316, the command knowledge base 216 is created. The command knowledge base 216 may be structured according to any convenient text or binary format.

In one embodiment, the command knowledge base is stored in Extensible Markup Language (XML) format according to the example schema shown in FIG. 4. In operation, an NMS can receive, parse, and use such a command knowledge base.

Using the preceding general process, based on basic command syntax knowledge, an auto-learner framework generates a series of requests and analyzes responses from a network element until all commands are completely learned.

2.3 Context Processing

Certain network elements and operating systems support multiple command views or contexts. For example, when a particular command is executed, the view or context changes, and subsequent commands have different meaning or cause different results than if the same commands were executed in the prior context. The new view or context typically contains different commands than the commands allowed in the preceding view or context. Further, the same commands may require different parameters in a different context or view.

In one embodiment, analyzing a response at step 309 of FIG. 3B further involves identifying whether a context change has occurred. If a context change occurs, then the process of FIG. 3B is recursively invoked to capture all commands and parameters for the new context or view.

In one embodiment, detecting a context change involves detecting when a response from a network element uses a different prompt string. In other embodiments, detecting a context change may involve detecting other information in a response from a network element. The syntax knowledge 204 may define, for each supported network device or device type, what information in a response from a network element indicates a context change.

Additionally or alternatively, a change in context or view is identified by comparing a list of commands in a current view to a parent view. If any change in context or view occurs, the process creates a new view in the knowledge base 216 and changes the current view to the newly created view.

2.4 Syntax Knowledge Example

In one embodiment, syntax knowledge 204 comprises:

1. Information defining how to generate a sequence of related requests to cause a network element to reply with a complete command definition. For example, such information may specify how to use "help" commands, or the equivalent, to cause the network element to provide information that defines commands.

2. Information defining how to interpret a response from a network element to determine: if the command is complete; if the command is incomplete and still needs some more parameters, or is incorrect; if the command is invalid; the type of valid values that the network element expects for parameters; whether a parameter is mandatory; and the correct execution context for the command.

For example, syntax knowledge 204 for a particular type of network device may comprise the following:

1. The command "?" causes the device to reply with a list of valid commands for the current view or context, including command name and description. An example of output in response to a "?" command is:

| | |
|---|---|
| show | show command |
| dir | list contents of a directory |
| copy | copy a file |

2. Sending a valid command followed by the character "?" causes the device to reply with a specification of the next parameter for the command. Example commands and reply output is:

"copy ?" generates a reply of: "TOKEN specifies source file"

"copy srcfile ?" generates a reply of: "TOKEN specifies destination file"

"copy srcfile dstfile ?" generates a reply of "NOMORE" or "<CR>" (carriage return character).

3. Sending an invalid command causes the device to generate a response containing the string "Invalid command."

4. Sending an incomplete command causes the device to generate a response containing the string "Incomplete command."

5. When the string "TOKEN" appears in a response, text input is required at the position indicated by TOKEN.

6. When a response includes values of the form "A.B.C.D", an Internet Protocol (IP) address is required in a valid, complete command at the position indicated by "A.B.C.D."

7. "NOMORE" or "<CR>" (carriage return character) indicates that no other parameters are allowed or required.

For devices from Cisco Systems, Inc., the following values of TOKEN are stored in syntax knowledge 204 and recognized in commands: IPADDRESS; IPV6ADDRESS; IPADDRESSMASK; MASK; WORD; LINE; FILENAME; HOSTNAME; MACADDRESS; CHAR; LOWCHAR; MONTH; DAY; SIMPLETIME; COMMUNITY; VPNCOMMUNITY; TIME; DELAY; METRIC; HEXDESCR; HEXDATA; HEXSTRING; HEXNUM; APPLETALKIP; NOVELLEIGRPIP; VINES; APOLLO. In other embodiments, syntax knowledge 204 may identify different recognized keywords or token values.

3.0 Implementation Mechanisms—Hardware Overview

Figure 5:
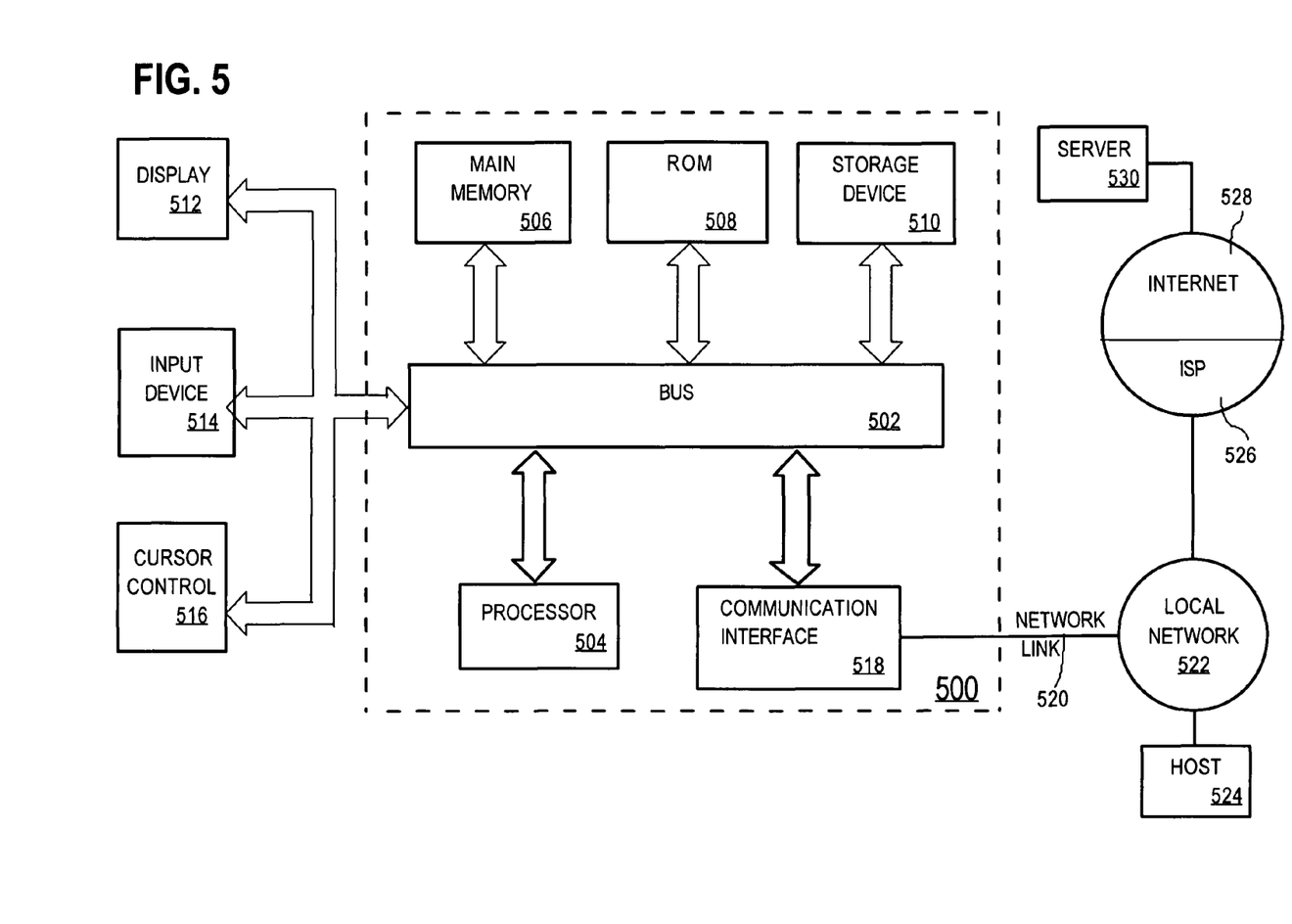
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory ("RAM") or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory ("ROM") 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube ("CRT"), for displaying information to a computer user. An input device 514, including alphanumeric and other keys, is coupled to bus 502 for communicating information and command selections to processor 504. Another type of user input device is cursor control 516, such as a mouse, trackball, stylus, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for generating diagnoses of network problems. According to one embodiment of the invention, generating diagnoses of network problems is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network ("ISDN") card or a modem to provide a data communication connection to a corresponding type of telephone line. As another example, communication interface 518 may be a local area network ("LAN") card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider ("ISP") 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for generating diagnoses of network problems as described herein.

The received code may be executed by processor 504 as it is received, and/or stored in storage device 510, or other non-volatile storage for later execution. In this manner, computer system 500 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising machine-implemented steps of:
receiving a syntax information for a command help syntax of a network device;
sending a seed command to the network device;
receiving and storing a response from the network device;
creating and storing information identifying a set of commands that the network device supports, based on the response, in a database of command knowledge;
repeating the following steps (i) through (iii) for each command of the set of commands that the network device supports until the information in the database represents all commands and parameters that the network device supports:
(i) determining and sending to the network device one or more command requests containing the each command that cause the network device to respond with additional information defining supported commands, said one or more command requests include a valid Internet Protocol (IP) address for an interface of a wireless access point in response to determining that said each command allows configuring the interface;
(ii) creating and storing additional information identifying additional commands or parameters supported by the network device, based on responses from the network device to the one or more command requests, in the database; and
(iii) upon determining that a first set of additional information received in response to a first command request containing the each command is the same as a second set of additional information received in response to a second command request containing the each command, wherein the second command request includes a parameter from the first set of additional information, performing the steps of (a) storing in the database of command knowledge information that indicates that an unlimited parameter list exists for the each command; and (b) discontinuing the repeating for the each command;
detecting a response that indicates when a previously issued command has caused the network device to change command context; and
storing information defining subsequent commands and parameters in a different context in the database of command knowledge,
wherein the machine-implemented steps are performed by one or more computing devices comprising one or more processors.

2. A method as recited in claim 1, wherein the seed command is any of a help command and a "?" command.

3. A method as recited in claim 1, wherein the syntax information identifies, for a particular network device type, a command that causes the network device to respond with a list of all commands supported by that particular network device type.

4. A method as recited in claim 1, wherein the syntax information identifies, for a particular network device type, a response that indicates when a previously issued command is missing a required parameter.

5. A method as recited in claim 1, wherein the syntax information identifies, for a particular network device type, a response that indicates when a previously issued command is missing a required sub-command.

6. A method as recited in claim 1, wherein the syntax information identifies, for a particular network device type, a response that indicates when a previously issued command included a parameter having an incorrect format.

7. A computer system comprising:
 a non-transitory computer-readable storage medium having recorded thereon a syntax information for a command help syntax of a network device, a seed command, and a special case handling logic;
  wherein the special case handling logic comprises instructions for handling exceptions to general rules defined in the command help syntax;
 an auto-learning framework that is communicatively coupled to the non-transitory computer-readable storage medium and comprising a request generator and a response handler; and
 a database of command knowledge;
 wherein the auto-learning framework comprises one or more sequences of instructions which, when executed by one or more processors, cause the one or more processors to perform the steps of:
 receiving a syntax information for a command help syntax of a network device;
 sending a seed command to the network device;
 receiving and storing a response from the network device;
 creating and storing information identifying a set of commands that the network device supports, based on the response, in a database of command knowledge;
 repeating the following steps (i) through (iii) for each command of the set of commands that the network device supports until the information in the database represents all commands and parameters that the network device supports:
  (i) determining and sending to the network device one or more command requests containing the each command that cause the network device to respond with additional information defining supported commands, said one or more command requests include a valid Internet Protocol (IP) address for an interface of a wireless access point in response to determining that said each command allows configuring the interface;
  (ii) creating and storing additional information identifying additional commands or parameters supported by the network device, based on responses from the network device to the one or more command requests, in the database; and
  (iii) upon determining that a first set of additional information received in response to a first command request containing the each command is the same as a second set of additional information received in response to a second command request containing the each command, wherein the second command request includes a parameter from the first set of additional information, performing the steps of (a) storing in the database of command knowledge information that indicates that an unlimited parameter list exists for the each command; and (b) discontinuing the repeating for the each command;
 detecting a response that indicates when a previously issued command has caused the network device to change command context; and
 storing information defining subsequent commands and parameters in a different context in the database of command knowledge.

8. A computer system as recited in claim 7, wherein the seed command is any of a help command and a "?" command.

9. A computer system as recited in claim 7, wherein the syntax information identifies, for a particular network device type, a command that causes the network device to respond with a list of all commands supported by that particular network device type.

10. A computer system as recited in claim 7, wherein the syntax information identifies, for a particular network device type, a response that indicates when a previously issued command is missing a required parameter.

11. A computer system as recited in claim 7, wherein the syntax information identifies, for a particular network device type, a response that indicates when a previously issued command is missing a required sub-command.

12. A computer system as recited in claim 7, wherein the syntax information identifies, for a particular network device type, a response that indicates when a previously issued command included a parameter having an incorrect format.

13. A non-transitory computer-readable storage medium storing one or more sequences of instructions which, when executed by one or more processors, cause the one or more processors to perform the steps of:
 receiving a syntax information for a command help syntax of a network device;
 sending a seed command to the network device;
 receiving and storing a response from the network device;
 creating and storing information identifying a set of commands that the network device supports, based on the response, in a database of command knowledge;
 repeating the following steps (i) through (iii) for each command of the set of commands that the network device supports until the information in the database represents all commands and parameters that the network device supports:
  (i) determining and sending to the network device one or more command requests containing the each command that cause the network device to respond with additional information defining supported commands, said one or more command requests include a valid Internet Protocol (IP) address for an interface of a wireless access point in response to determining that said each command allows configuring the interface;
  (ii) creating and storing additional information identifying additional commands or parameters supported by the network device, based on responses from the network device to the one or more command requests, in the database; and
  (iii) upon determining that a first set of additional information received in response to a first command request containing the each command is the same as a second set of additional information received in response to a second command request containing the each command, wherein the second command request includes a parameter from the first set of additional information, performing the steps of (a) storing in the database of command knowledge information that indicates that an unlimited parameter list exists for the each command; and (b) discontinuing the repeating for the each command;
 detecting a response that indicates when a previously issued command has caused the network device to change command context; and
 storing information defining subsequent commands and parameters in a different context in the database of command knowledge;
 wherein the machine-implemented steps are performed by one or more computing devices comprising one or more processors.

14. A non-transitory computer-readable storage medium as recited in claim 13, wherein the seed command is any of a help command and a "?" command.

15. A non-transitory computer-readable storage medium as recited in claim 13, wherein the syntax information identifies, for a particular network device type, any of: (a) a command that causes the network device to respond with a list of all commands supported by that particular network device type; (b) a response that indicates when a previously issued command is missing a required parameter; (c) a response that indicates when a previously issued command is missing a required sub-command; (d) a response that indicates when a previously issued command included a parameter having an incorrect format.

* * * * *